Figure 1:
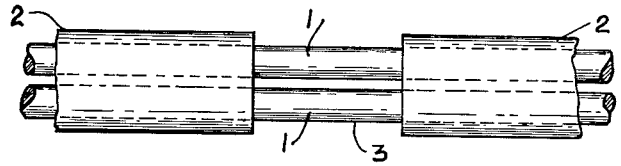

Aug. 30, 1955 K. TATOR 2,716,623
METHOD OF INSULATING A SHORT SECTION OF AN ELECTRIC CABLE
Filed March 13, 1951 3 Sheets-Sheet 1

INVENTOR.
Kenneth Tator
BY
Brown, Critchlow, Flick & Peckham
his Attorneys

Aug. 30, 1955     K. TATOR     2,716,623
METHOD OF INSULATING A SHORT SECTION OF AN ELECTRIC CABLE
Filed March 13, 1951     3 Sheets-Sheet 2

INVENTOR.
Kenneth Tator
BY Brown, Critchlow,
Flick & Peckham
his attorneys.

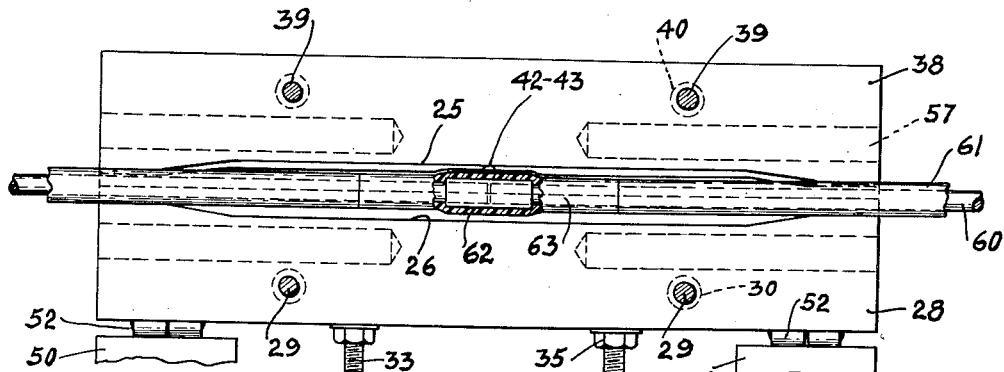
Fig.10.
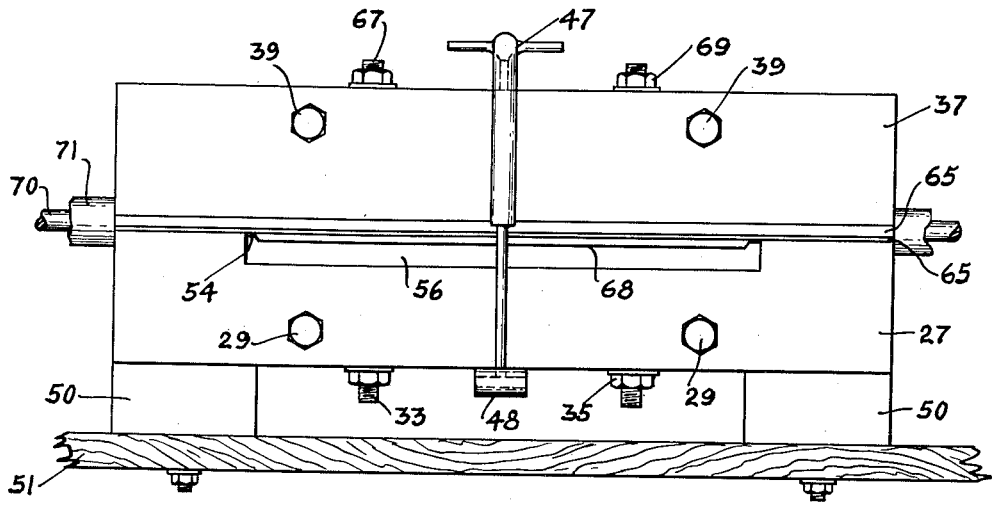
Fig.11.
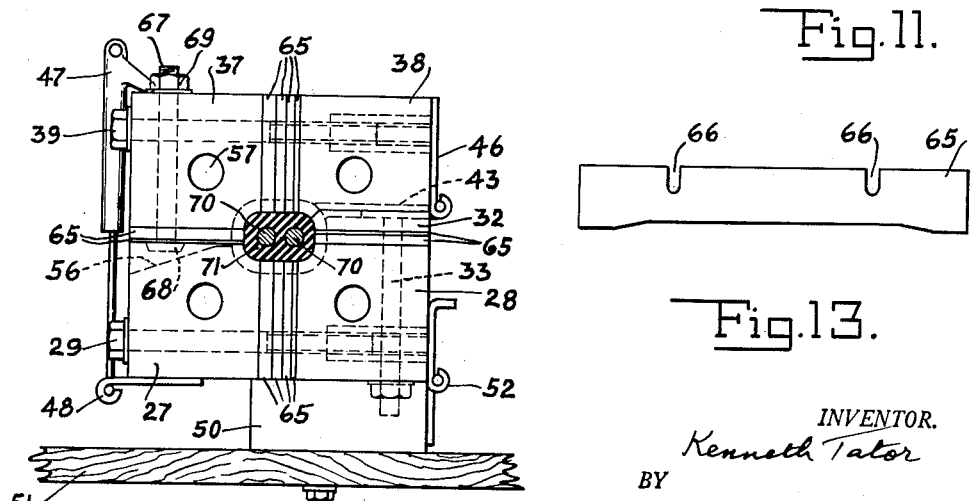
Fig.12.
Fig.13.
INVENTOR.
Kenneth Tator
BY
Brown, Critchlow, Flick & Peckham
his attorneys.

United States Patent Office 2,716,623
Patented Aug. 30, 1955

2,716,623

METHOD OF INSULATING A SHORT SECTION OF AN ELECTRIC CABLE

Kenneth Tator, Coraopolis, Pa.

Application March 13, 1951, Serial No. 215,274

9 Claims. (Cl. 154—2.22)

This invention relates to insulated electric cables, and to a method of insulating short lengths of them where the original insulation has been worn away or where splices have been made.

This invention is particularly applicable in connection with trailing mine cables, which are the electric cables that connect sources of electric power with electrically driven mine cars and machinery. These cables receive rough treatment because they are dragged around the mine passages and rooms. As a result, the insulation may be worn away or damaged in different locations, and sometimes the cables break or burn in two and therefore must be spliced. Heretofore, there have been three different methods of insulating the exposed conductors at the worn spots or splices. The first of these has been temporary repair, in which the conductors have been covered and separated with electrician's and friction tapes without heat fusing or vulcanizing the tape windings into a vulcanized compacted mass. This method has the advantage of speed, allowing resumption of service within about thirty minutes after current interruption and can be performed with a minimum of tools, equipment and materials. However, there are the serious disadvantages of producing insulation repairs which do not conform to the normal contours of the original insulation and which are so susceptible to wear, fraying, unwinding and moisture penetration that they are recognized as potential points of early refailure, so that mandatory restrictions are placed on their use.

In the second or permanent method of repairing insulated cables the conductors are covered and separated with tape as in the temporary method just described, but in this method the tapes are specially compounded combinations of vulcanizable and vulcanized rubbers, and the taping operation is followed by a vulcanizing process in which heat and pressure compact and vulcanize the tape bundle into a mass which follows closely the contours of the original insulation and which has a smooth, tough, moisture impervious surface. While this method is capable of producing repairs with long and satisfactory service life, it has three principal disadvantages. 1. The required vulcanization of the rubber tape windings is a time-temperature reaction, the time required depending upon the temperature available and the cable dimensions; vulcanizing times of 45 minutes to one hour being a good average and longer time requirements not uncommon. This vulcanizing time is in addition to the time, about 30 minutes, required to splice the conductors and prepare the tape windings, making an average total time to effect a repair by this method of approximately one hour and a half. 2. Furthermore, the mold required for this vulcanizing operation is necessarily designed to impose pressure on the insulation mass and therefore is of heavy construction and not readily portable. As a result of the long time required to complete repairs and the difficult mobility of the equipment, this process is seldom performed at the point and time of electrical cable damage, but rather is used in a central shop location to reclaim damaged cable which has been taken out of service and on which temporary tape repairs had been made previously to maintain the cable in service. 3. The third disadvantage of this process is that the vulcanizable tapes required have a limited storage life. They gradually vulcanize in the roll and thereby render themselves unfit for subsequent use.

The third method of cable insulation repair practiced heretofore is to melt suitable thermoplastics to a fluid state and then pour or inject the hot fluid into suitable molds surrounding the cable at the point of repair. Insulating materials such as bitumins, polyethylene, and softened rubbers have been used. This process has the advantage of producing dense, compact insulations conforming closely to the contours of the original insulation and having smooth, tough, impervious surfaces. Disadvantages, however, are seven-fold: 1. The material must be separately melted by heating as a separate operation before the re-insulation operation whereby melting and pouring equipment are required in addition to the cable mold. 2. During the process all equipment and materials are hot (at temperatures between 250 and 400° F. depending upon the thermoplastic used) and therefore hazards and delays through burns are always prevalent. 3. As the hot molten material contacts cold portions of the cable it will congeal at those points to a solid, thus preventing perfect fusion on or into cable and conductor surfaces. 4. Prolonged heating of the thermoplastic material, or heating it at too high a temperature, will cause change in the properties of the material either by thermal decomposition or oxidation or by loss of volatile components. 5. Mold and cable must be allowed to cool before the mold can be removed and the cable put back into service, because the insulating material is fluid at insulating temperatures. 6. There is no control of the spatial relationship of the conductors within the insulation material. Conductor sag, the added thickness of the conductor splice, or unequal lengths of exposed spliced conductors within a multi-conductor cable may produce insufficient insulation material around or between the conductors, resulting in early failure through grounding or short-circuiting. 7. Lastly, the total time required for conductor splicing, insulation melting, pouring and cooling renders this method impractical in cases where fast resumption of service is required.

The use of vulcanizable rubbers and rubber-like materials in any of the foregoing methods is objectionable for the reasons already given and for the further reason that lack of fluidity of such materials prevents them from wetting and flowing properly on and into cable and conductor surfaces and interstices within the confining mold. It also has been found that solutions or mobile doughs of insulation material in volatile solvents dispersion media require too long a drying period for the required insulation thicknesses, and the resulting shrinkage as well as application difficulties produce a distorted insulation that bears little resemblance to the form of the original insulation.

It is among the objects of this invention to provide a method of permanently insulating cable splices or sections where the original insulation has worn away or has been damaged, which is easy to practice at the location of the cable failure, which is very rapid, which assures proper spacing of the conductors, which seals the conductors, which requires only the use of inexpensive and readily portable equipment, and which does not require handling hot insulating material. A further object of this invention is to provide an electric cable that has been repaired with flexible, compact, dense, impervious and durable insulation by this method, and in which that insulation surrounds a preformed insulating member holding the conductors apart or surrounding a conductor when the cable contains a single conductor. A still further object is to provide a novel mold in which my method can be carried out, the mold being adjustable to receive cables having cross sectional areas of various shapes and sizes.

In accordance with this invention, the exposed portions of the conductors at a gap in the original insulation of a multiple conductor electric cable are spaced apart, preferably by an insulating member, and then they are placed in a mold, into which liquid plastisol is introduced. The plastisols are dispersions of organic resins in their compatible liquid modifiers, usually plasticizers. This material completely surrounds the conductors and engages and preferably surrounds the adjacent ends of the insulation on the cable at the opposite ends of the gap. The mold is heated to convert the body of liquid plastisol into a flexible solid which is fused at its ends onto the original cable insulation. The liquid plastisol should be heated to a temperature at which it becomes a tough flexible solid so that after it cools it will have the desired strength, and it is heated long enough for the heat to be distributed throughout the material. This requires only a few minutes. At that temperature or slightly above it the resin coalesces into a coherent flexible body which is dense and tough. The insulating member that holds the conductors apart when they are first placed in the mold preferably is provided with a pair of parallel passages separated by a partition and slit lengthwise to receive the conductors. This invention also is applicable to cables that contain only one conductor. It is preferred that the mold be readily adjustable so that the size and shape of the mold cavity can be changed to accommodate various sizes and shapes of cables. This can be done by dividing the mold into sections and spacing the different sections the desired distance apart by means of shims.

Figure 2:
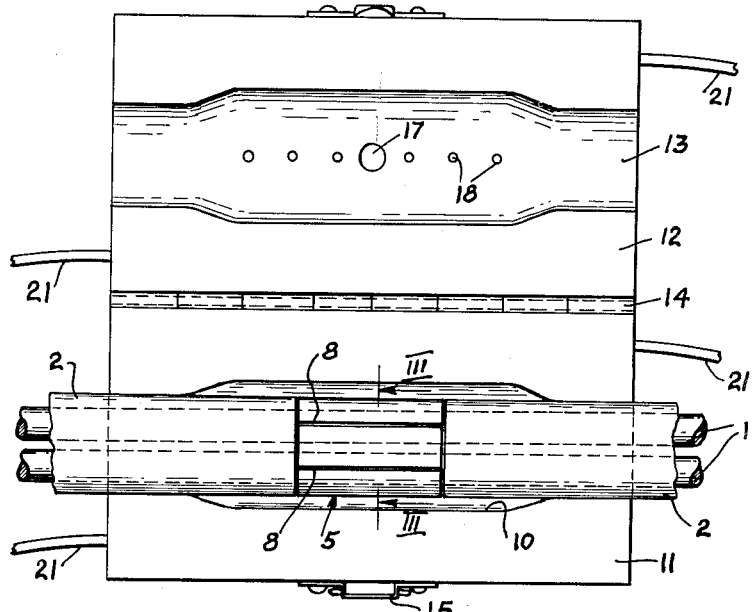
Figure 3:
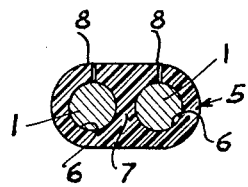
Figure 4:
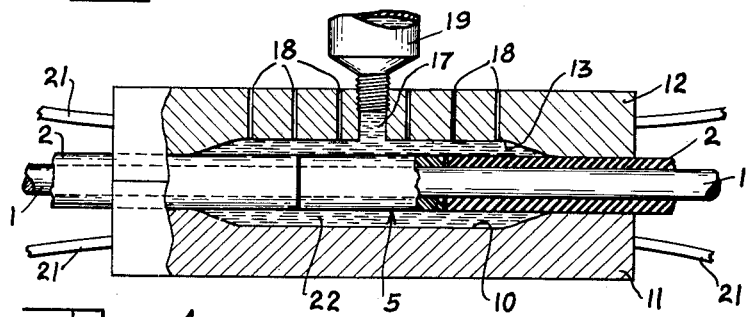
Figure 6:
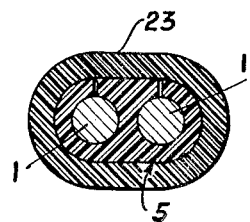
Figure 5:
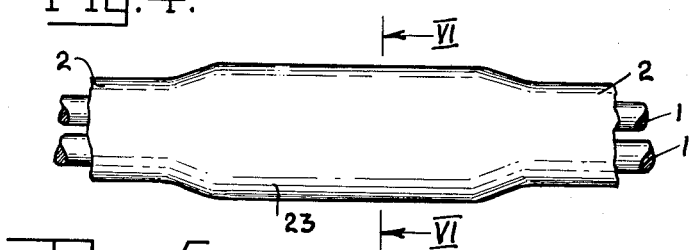
Figure 7:
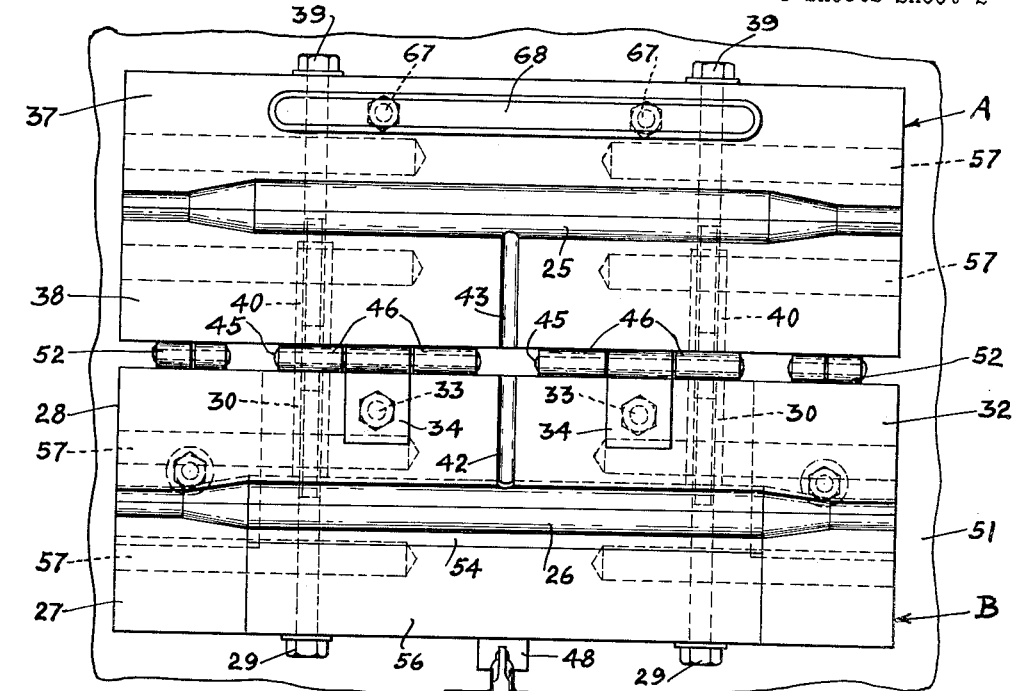
Figure 8:
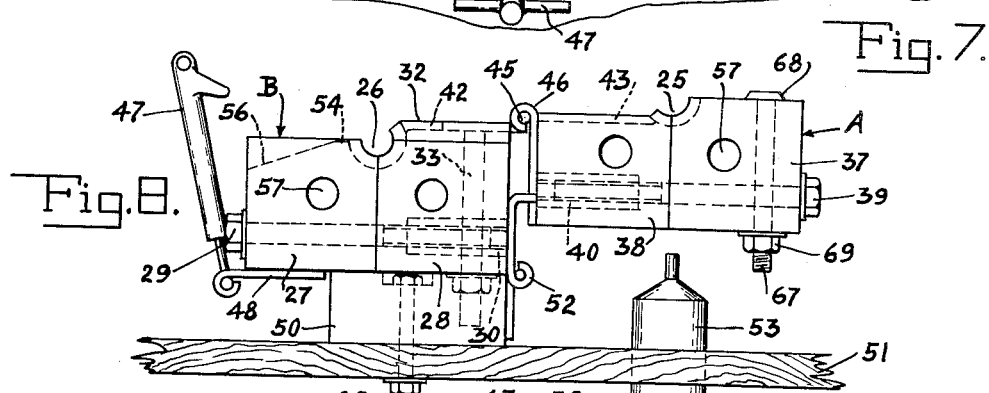
Figure 9:
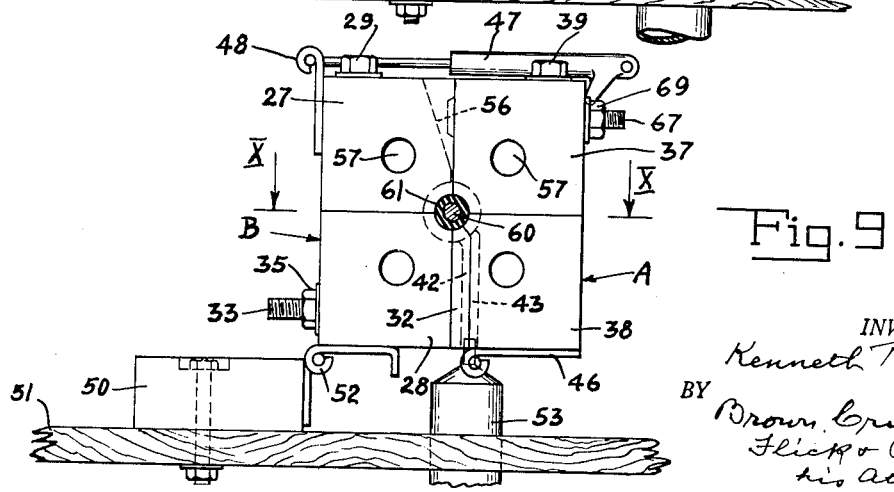

The invention is illustrated in the accompanying drawings, in which Fig. 1 is a side view of a section of electric cable having two conductors exposed at a gap in the insulation; Fig. 2 is a similar view of the cable with an insulating member applied to the conductors in the gap, and with the cable lying in the lower half of an open mold shown in plan; Fig. 3 is an enlarged cross section of the cable taken on the line III—III of Fig. 2; Fig. 4 is a vertical longitudinal section through the closed mold with liquid plastisol therein, part of the mold and cable being shown in elevation; Fig. 5 is a side view of the cable after it has been removed from the mold; Fig. 6 is an enlarged cross section of the cable taken on the line VI—VI of Fig. 5; Fig. 7 is an open mold view, similar to Fig. 2, of an adjustable mold; Fig. 8 is an end view of the open mold; Fig. 9 is an end view of the closed adjustable mold in filling position; Fig. 10 is a longitudinal section taken on the line X—X of Fig. 9, showing a spliced single conductor cable ready to be insulated; Fig. 11 is a front view of the adjustable mold after it has been enlarged by shims; Fig. 12 is an end view of the enlarged mold; and Fig. 13 is a reduced face view of one of the shims.

Referring to Fig. 1 of the drawings, the electric cable shown consists of a pair of electric conductors 1 which are spaced apart and surrounded by conventional insulation 2, such as rubber. However, the cable could include a single conductor, or three or more conductors. When a section of the insulation becomes worn away or when two lengths of cable are spliced together, the insulation at the opposite ends of the worn portion or splice is trimmed off neatly and any pieces of insulation remaining between those ends are removed. There is thus formed in the insulation a gap 3 where portions of the conductors are exposed. To insulate these bare portions of the conductors the following procedure is followed.

It is highly desirable first to place an insulating member between and around the two bare conductors so that they will not accidentally touch each other later, and to insure that there will be at least a required minimum thickness of insulation around each conductor and between them. For this purpose, as shown in Figs. 2 and 3, it is preferred to use a single flexible insulating member 5 which is of the same general shape in cross section as the main insulation 2 of the cable, but of smaller cross sectional area. The insulating member is provided with a pair of parallel passages 6 extending lengthwise through it, spaced apart by a partition 7 integral with the rest of that member. To allow the insulating member to be applied to the conductors in gap 3, the walls of the two passages are slit lengthwise at 8, preferably at one side of the member. By temporarily spreading the insulating member at the slits, the conductors can be pressed into passages 6. The insulating member then will surround the two conductors and hold itself on them, and it also will hold them apart.

The section of the cable that supports insulating member 5 then is laid in a recess 10 extending across the lower half 11 of a metal mold. The end portions of the insulation 2 at the opposite ends of gap 3 are received in the opposite ends of this recess and extend into the deeper and wider central portion of the recess which forms a cavity that is connected to the narrower ends of the recess by tapered portions. The upper half 12 of the mold, is provided with a recess 13 of substantially the same shape as the one in the lower half, so as to fit around the upper half of the cable when the mold is closed. The two halves of the mold are connected together by a hinge 14 so that the upper half can be swung over and down upon the lower half. The two halves of the closed mold are then held together by a latch 15. It is very desirable to center the cable in the mold cavity as much as possible, so that the insulation applied to the cable during the molding operation will have more or less uniform thickness all around the cable. The cable may be stiff enough to extend straight through the cavity, or the portions of the cable extending out of the mold can be pulled to straighten it and then clamped to hold it straight. If desired, the cable can be blocked up in the mold by a piece of the same material of which insulating member 5 is made.

As shown in Fig. 4, the end portions of the mold fit snugly around the cable extending through it, but the mold does not have to be very tight. The upper half of the mold is provided with a central filling opening 17 and with several small vent holes 18 near it. The liquid material that is to be used for insulating the conductors in gap 3 is introduced through this filling opening, and as it enters the mold cavity the air in the cavity escapes through the vent holes. A convenient way of filling the mold cavity is to attach to the filling opening the nozzle of a pipe or cylinder 19 which contains the insulating material that can be forced from the cylinder in any suitable manner and into the mold.

According to this invention, the insulatig material used for this purpose is a liquid plastisol, which is a dispersion of an organic resin in its compatible liquid modifier, usually a plasticizer. As such these plastisols are liquids of a viscosity somewhat greater than that of the liquid modifiers. The nature of the liquid modifier is such that at normal atmospheric temperatures the modifier has little tendency to solvate the resin, but at elevated temperatures solvation is rapid. The temperature of solvation is determined by the natures of the resin and modifier. By properly proportioning the volumes of modifier to resin, solvation may result in the complete absorption of the modifier by the dispersed resin and thus result in complete conversion of the plastisol into a solid. At that stage the solid is weak, possessing poor cohesion. Upon raising the temperature to the point of incipient fusion, coalescence is completed and the cohesion of the solid is such that, upon cooling, a strong and tough solid results.

For purposes of electric cable insulation, only those plastisols which will provide good electrical properties, moisture resistance, cohesion and flexibility are of interest. They include vinyl-acetate and chloride-acetate copolymers, chloroprene, vinylidene chloride, and chlorinated rubbers, all in liquid plasticizers. It is preferred to use vinyl plastisol, which is a commercially available dispersion of vinyl chloride-acetate copolymer in a liquid plasticizer. Examples of such plastisols are: 100 parts of vinyl chloride-acetate polymer, and 70 parts of one or more liquid plasticizers such as dioctyl phthalate, dioctyl sebacate, dioctyl adipate, dicapryl phthalate or tricresyl phosphate. To the plastisol it is highly desirable to add 2 parts of stabilizers, such as epichlorhydrin, or tribasic lead oxide or carbonate. The viscosity of vinyl plastisol is rather high, and the molecular weight of the copolymer is of the order of 21,000. Vinyl plastisol is thermoplastic, but it is peculiar in that it will solidify or set after being heated to a temperature between about 130° F. and 180° F., depending on the plasticizer used. If the vinyl plastisol is heated still higher the copolymer continues to coalesce until, upon being cooled from the fusion temperature of the material, it forms a coherent flexible body of considerable strength. The fusion temperature is about 350° F. To obtain complete fusion of the material and the resulting desired toughness when cooled, the mold is heated in any convenient manner, suitably by electricity supplied through wires 21, to about 375° F. for about five minutes so that all parts of the body 22 of the liquid vinyl plastisol filling the mold cavity will reach at least 350° F.

Except for a unique property discovered in the plastisols, it would be necessary to inject the plastisol into a cold mold and then raise its temperature to the fusion point of the plastisol to avoid solidification of the material on contact with a hot surface, which would result in the solid formation blocking the flow of plastisol to more remote areas within the mold cavity. With the plastisols, however, below a rather sharply defined solidification temperature an increase in temperature will cause an increase in fluidity through a maximum before solidification occurs. As an example, a vinyl plastisol mentioned in the preceding paragraph will attain maximum fluidity at about 110° F., and then will start to solidify as its temperature is raised still higher. This increase in fluidity is so effective in permitting complete penetration within the mold cavity that liquid insulation can be injected into preheated molds and yet the resulting solid insulation surface will exactly reproduce all irregularities and characteristics of the confining hot mold surface.

As soon as the short heating period is over, the mold is opened and the cable, with the flexible solidified vinyl plastisol 23 surrounding it, can be removed from the mold. In case the conductors in gap 3 of the cable are not centered in the mold cavity, they will be protected at least by insulating member 5. If they are centered, the insulating member will be completely surrounded by plastisol too. Since some of the liquid vinyl plastisol in the mold surrounded the adjacent ends of the original insulation 2 on the cable, the solidified vinyl plastisol will be fused onto that insulation. Consequently, the conductors in gap 3 are sealed in the new insulation. To insure good fusion of the vinyl plastisol with insulating member 5, it is preferred to make the latter from vinyl plastisol too. In emergencies or for temporary use, the bare conductors in the gap in the original insulation can be separated and insulated by means of the insulating member 5, around which tape can be wrapped.

The plastisols are well suited for cable insulation repair according to this invention, as they are stable mobile liquids at atmospheric temperatures, yet after solvation and fusion they produce tough, flexible and resilient solid masses possessing dielectric strengths of the order of 500 volts per mil at 60 cycles, and moisture absorptions of less than 0.5% at 68° F. in 24 hours. My insulating process is very fast and provides the cable with insulation as durable as the original insulation. It can be practiced at the mine location where the cable failure occurs, since there is no handling of hot insulating material and the mold is small and light in weight.

As contrasted with vulcanizable rubber masses and tapes, storage stability of the plastisols is excellent. There is nothing to evaporate, and there is no progressive chemical reaction. Unlike rubbers and bitumin compositions, they are non-inflammable both in their liquid and solid forms.

Plastisols require no melting equipment, as do hot-melt applied thermoplastics, and all materials are handled while cold. Being liquids, and especially ones not congealed by contact with cold objects, as contrasted with the hot-melt thermoplastics, they can be introduced easily into a confining mold and will quickly wet and flow on and into all surfaces of the cable and conductors, and will fill completely the mold cavity with a minimum of pocketed, occluded or entrapped voids. This is all accomplished without pressure, as contrasted with the rubber tape vulcanizing process. Hence, the mold equipment may be kept light, simple and portable.

As contrasted with the vulcanization process, solidification and development of strength of the plastisols is a temperature function rather than a time-temperature function, and the speed of completion is limited only by the time required to raise the plastisol to conversion temperatures. With my process completed cable repairs are produced with only five minutes heating time in the mold, as compared with 45 to 60 minutes for rubber vulcanization. Furthermore, the repaired cable may be removed from the hot mold and immediately put back into service, because the plastisol is a solid at all operating temperatures above the solidification stage. Due to this last feature, it is not necessary that the enclosing mold fit tightly at its ends around the cable to prevent liquid loss, since any plastisol which tends to seep out through such ends will, by virtue of its thinness in these passages, be heated rapidly to its solidification temperature and seal off the ends.

The mold described above is simple in construction and easy to use, but it has limitations insofar as the number of different size cables that can be insulated in it is concerned. Electric cables which can be repaired by my process come in many sizes and several shapes. A mold which will accommodate most of such cables is disclosed in Figs. 7 to 12. This improved mold is adjustable to vary the size and shape of the mold cavity in transverse section. The mold is shown in its smallest size in Figs. 7 to 10, for receiving a circular cable containing only one electrical conductor or concentric conductors. The mold cavity which extends from end to end of the mold through its center, therefore is circular in cross section. The ends of the cavity fit more or less snugly around insulated portions of the cable which extend some distance into the cavity. Like in the mold first described herein, the end portions of the cavity diverge inwardly to the long central portion of the cavity which has a diameter considerably greater than that of the insulated cable. The mold is formed from an upper section A hinged to a lower section B. The portion of the mold cavity in the upper section is formed by a recess 25, while a recess 26 in the lower section forms the rest of the cavity. The lower section of the mold is divided lengthwise along the bottom of recess 26 into two parts 27 and 28 which are held together by two bolts 29. The bolts are slidably mounted in the front part 27 and are threaded in sleeves 30 rigidly mounted in the back part 28. Mounted on top of the back part is a thick plate 32, the front surface of which forms part of the back wall of the mold cavity. This plate is clamped on top of the back part of the lower section of the mold by studs 33. The upper ends of the studs are welded to metal straps 34 countersunk in the upper surface of the plate. The studs extend down through the underlying part of the mold and project from its bottom. Nuts 35 are screwed on the studs and tightly against the bottom of the mold.

The upper section of the mold likewise is formed in two parts 37 and 38 meeting along a vertical plane directly above the joint between the two lower parts of the mold. The two upper parts of the mold are connected by bolts 39 which extend slidably through the front part 37 and are threaded in sleeves 40 rigidly mounted in the back part. When the mold is closed, the front parts of its upper and lower sections meet along the horizontal central plane of the mold cavity, but the back half of the mold has its parting line above that plane at the upper surface of plate 32. The filling passage or sprue is located at the center of the mold between the upper section A and plate 32. That is, a semi-circular channel 42 extends across the top of the plate, and a similar channel 43 across the bottom of the back part 38 of the upper section. When the mold is closed, these two channels form a circular passage for introduction of the insulating material into the mold cavity. When the mold is opened, the sprue also is opened to permit it to be cleaned out very easily.

The upper and lower sections of the mold are hinged together at the back. For this purpose the stud straps 34 extend behind the mold and are provided with loops for receiving hinge pins 45. Similar straps 46 are welded to the rear surface of the upper section of the mold and have their lower ends provided with loops aligned with the lower section loops for also receiving the hinge pins to complete the hinges. The closed mold may be clamped shut by any suitable means, such as by a swinging spring-actuated barrel latch 47 of well-known type having its lower end swiveled in a bar 48 projecting from the bottom of the front of the mold.

In filling the mold it is preferred to lay it on its back so that the insulating material will be injected upward through the sprue. For this purpose the mold in its normal upright position shown in Figs. 7 and 8 is mounted on a pair of blocks 50 (Figs. 10 and 11) bolted to the top of a table or bench 51. The blocks space the projecting studs 33 from the bench. The mold is connected to the blocks by means of hinges 52 attached to the back of the blocks and the back of the mold. When the closed mold is swung on these hinges backward to bring the sprue into a vertical position as shown in Fig. 9, the lower end of the vertical sprue fits down over the nozzle of a cylinder 53 projecting from the top of the bench. The cylinder is filled with the liquid insulating material, which can be ejected from it and into the sprue in any suitable manner. To permit venting of the mold cavity as it is filled, the upper side of the front part 27 of the horizontal lower section B of the mold is provided along the front edge of its recess 26 with a slight depression 54 which forms a vertical slot between the upper and lower sections of the closed mold when the mold is swung back into filling position. Air can escape up through this slot as the mold is filled from below. When the plastisol starts to fill the slot, it is known that the mold cavity below it is filled. After the molding operation the very thin strip of plastisol formed in the slot can be torn from the cable. The slot extends outward for only a short distance, and then the upper surface 56 of the horizontal lower section of the mold is inclined downward toward the front of the mold for a purpose that will be described presently.

The mold may be heated by electrically heating elements extending into longitudinal bores 57 formed in its opposite ends. The temperatures of the mold can be controlled in any suitable manner, such as by a thermostat (not shown).

The electric cable shown in Figs. 9 and 10 has a single conductor 60 enclosed by insulation 61. Although this could be a single cable that requires repair of a bad spot in its insulation, the cable is shown in two parts spliced together by a metal sleeve 62 compressed on the conductor ends in a well-known manner. A longitudinally split insulating member 63 encircles the sleeve and the exposed conductor portions between the sleeve and the ends of the original insulation.

The size of the mold cavity of this mold can be enlarged and its shape simultaneously changed to accommodate larger cables by inserting shims 65 between the different parts of the mold, as shown in Figs. 11 and 12. For example, the width of the mold can be changed by loosening the bolts 39 and 29 in its upper and lower sections A and B, pulling the two parts of each section apart, and sliding shims between the parts. As shown in Fig. 13, the shims are provided with transversely extending slots 66 to receive the bolts. The bolts then are tightened again to clamp the shims between the two pairs of each section. The height of the mold is changed in a similar way. The nuts 35 are loosened on the lower ends of vertical studs 33 that hold plate 32 in place, and then the desired shims are inserted between the plate and the top of the back part 28 of the lower section. At the front of the mold there are two studs 67, which extend vertically through front upper part 37 and have their lower ends welded to a horizontal bar 68 and have nuts 69 screwed on their upper ends. After the nuts have been loosened, the necessary shim or shims are placed between the bar and the lower surface of the upper section of the mold, and then the nuts are tightened again to clamp the shims in place. The bar 68 does not interfere with closing the mold, because it extends down into the recess formed by the inclined surface 56 of the lower section.

The end portions of the inner surfaces of the shims are shaped so that the shims will not change the shape of the mold cavity in longitudinal section. It will be seen in Fig. 12 that in cross section the shims provide flat top, bottom and side walls for the cavity, but that the four main parts of the mold form curved corner walls. A mold cavity of such shape accommodates satisfactorily electric cables that are more or less oval in which two or more conductors 70 are disposed side by side in insulation 71. The shims are made in different thicknesses so that any desired size cavity may be obtained. Insertion of the shims does not affect the sprue, because no shim is placed between plate 32 and the overlying part of the upper section of the mold. If the sprue extended along the central horizontal plane of the cavity below the plate, then the shims would pass through the center of the sprue and render it useless.

According to the provisions of the patent statutes, I have explained the principles of my invention and have illustrated and described what I now consider to represent its best embodiment. However, I desire to have it understood that, within the scope of the appended claims, the invention may be practiced otherwise than as specifically illustrated and described.

I claim:

1. The method of insulating the exposed portion of an electric conductor at a gap in the original insulation of an electric cable, said method comprising fitting a mold around the exposed portion of the conductor and the adjacent ends of the original insulation, filling the mold with a mobile liquid plastisol at room temperature, heating the mold until the plastisol solidifies into a flexible solid, and removing the cable from the mold thereby exposing the plastisol to room temperature.

2. The method of insulating the exposed portion of an electric conductor as described in claim 1 in which the mold is heated before the plastisol is poured into the mold to a temperature at which the plastisol solidifies into a flexible solid.

3. The method of insulating the exposed portion of an electric conductor as described in claim 1 in which an insulating member is placed around the conductor before the mold is fitted around the conductor to approximately center the conductor in the mold.

4. The method of insulating the exposed portion of an electric conductor as described in claim 1 in which the mold is heated to a temperature between about 350° and 375° F. and for a period of time sufficient to solidify the plastisol into a flexible solid.

5. The method of insulating the exposed portion of an electric conductor as described in claim 1 in which the plastisol is a dispersion of vinyl chloride-acetate copolymer in a liquid plasticizer.

6. The method of insulating the exposed portion of an electric conductor as described in claim 1 in which the plastisol is a dispersion of vinyl chloride-acetate copolymer in at least one plasticizer from the group consisting of dioctyl phthalate, dioctyl sebacate, dioctyl adipate, dicapryl phthalate and tricresyl phosphate.

7. The method of insulating the exposed portion of an electric conductor as described in claim 1 in which the plastisol comprises a resin of the group consisting of vinyl-acetate and chloride-acetate copolymers, chloroprene, vinylidene chloride and chlorinated rubber and a compatible plasticizer therefor.

8. The method of insulating the exposed portions of a plurality of parallel electric conductors at a gap in the original insulation of an electric cable, said method comprising separating the exposed portions of the conductors by means of an insulating block, fitting a mold around said separated exposed portions and the adjacent ends of the original insulations, filling the mold with a mobile liquid plastisol at room temperature, heating the mold until the plastisol solidifies into a flexible solid, and removing the cable from the mold thereby exposing the plastisol to room temperature.

9. The method of insulating the exposed portion of an electric conductor at a gap in the original insulation of an electric cable, said method comprising confining a body of mobile liquid plastisol at room temperature around the conductor in the gap and against the adjacent ends of the original insulation heating the plastisol until it solidifies into a flexible solid, and removing the cable from the mold thereby exposing the plastisol to room temperature.

References Cited in the file of this patent

UNITED STATES PATENTS

| | | |
|---|---|---|
| 1,693,365 | Boyle | Nov. 27, 1928 |
| 1,929,453 | Semon | Oct. 10, 1933 |
| 2,059,055 | Studt | Oct. 27, 1936 |
| 2,122,118 | Studt | June 28, 1938 |
| 2,161,447 | Bishop | June 6, 1939 |
| 2,247,064 | Nowak | June 24, 1941 |
| 2,312,652 | Komives | Mar. 2, 1943 |
| 2,332,376 | Haberberger | Oct. 19, 1943 |
| 2,463,231 | Wyatt | Mar. 1, 1949 |
| 2,497,757 | Bonnett | Feb. 14, 1950 |
| 2,500,969 | Violette | Mar. 21, 1950 |
| 2,511,436 | Kauth | June 13, 1950 |
| 2,536,173 | Hamilton | Jan. 2, 1951 |

FOREIGN PATENTS

| | | |
|---|---|---|
| 576,068 | Great Britain | of 1946 |